US00RE39330E

(19) United States
(12) Reissued Patent
Tozawa

(10) Patent Number: US RE39,330 E
(45) Date of Reissued Patent: Oct. 10, 2006

(54) SPEAKER SYSTEM AND A METHOD FOR IMPROVING SOUND QUALITY THEREOF

(76) Inventor: Katsutoshi Tozawa, 40-5, Nishiharacho 4-chome, Fuchu-shi, Tokyo 183 (JP)

(21) Appl. No.: 10/718,508
(22) Filed: Nov. 20, 2003

Related U.S. Patent Documents

Reissue of:
(64) Patent No.: 6,320,971
Issued: Nov. 20, 2001
Appl. No.: 08/842,682
Filed: Apr. 15, 1997

U.S. Applications:
(63) Continuation of application No. 08/373,250, filed as application No. PCT/JP92/01721 on Dec. 28, 1992, now abandoned.

(30) Foreign Application Priority Data

Jul. 23, 1992 (JP) ..... 4-237545

(51) Int. Cl.
*H04R 1/02* (2006.01)
*H04R 1/20* (2006.01)

(52) U.S. Cl. ..... 381/386; 381/348; 381/352; 381/353; 181/151; 181/155; 181/198

(58) Field of Classification Search ..... 381/386, 381/150, 152, 154, 158, 159, 160, 188, 395, 381/FOR. 145, FOR. 146, 87, 337, 338; 181/145, 151, 153, 155, 156, 198, 199
See application file for complete search history.

(56) References Cited

U.S. PATENT DOCUMENTS

| | | | | | |
|---|---|---|---|---|---|
| 1,975,201 | A | * | 10/1934 | Elworthy | 181/155 |
| 3,327,808 | A | * | 6/1967 | Shaper | 181/153 |
| 3,684,051 | A | * | 8/1972 | Hopkins | 181/199 |
| 3,978,941 | A | * | 9/1976 | Siebert | 181/151 |
| 4,398,619 | A | * | 8/1983 | Daniel | 181/199 |
| 4,750,585 | A | * | 6/1988 | Collings | 181/148 |
| 5,929,393 | A | * | 7/1999 | Jeter, Jr. | 181/199 |
| 6,393,129 | B1 | * | 5/2002 | Conrad et al. | 381/191 |

FOREIGN PATENT DOCUMENTS

| | | | | |
|---|---|---|---|---|
| DE | A-392178 | | 2/1991 | |
| DE | A-3927178 | * | 2/1991 | |
| GB | A-659818 | * | 10/1951 | |
| JP | 0186191 | * | 9/1985 | 181/151 |

OTHER PUBLICATIONS

The Radio Technology, article from the magazine for audiophile, Dec. 1, 1994.*
Supplementary European Search Report in the European Patent Application No. 93900401.6 corresponding to the present application, including copies of the first pages of the references cited in the report.*
Reference 1 Remarks about GA–A–659818.*
Reference 2 (Referential material regarding technical matters such as "voice coil impedance").*
Official Communication dated Oct. 5, 1999 from the EPO.*

* cited by examiner

*Primary Examiner*—Xu Mei
(74) *Attorney, Agent, or Firm*—Blackwell Sanders Peper Martin LLP

(57) ABSTRACT

A speaker system suppresses standing waves generated in the system and reproduces clear and dynamic bass sound. The system includes a cabinet formed of acoustic insulation walls, and at least one partition wall situated inside the cabinet to form a space by surrounding the space. The partition wall suppresses the standing waves generated inside the cabinet and is formed of a material having high internal loss. [The space has a total capacity more than one tenth of a capacity of the cabinet, wherein a closed end of the partition wall is located between one-half and four-fifths of a distance from one end to the other end, and an opening area of the same partition wall is located at a side opposite to the closed end in a longitudinal direction of the cabinet. The opening area is located between four-fifths and five fifths of a distance from one end to the other end.] *The material has a density per volume greater than 0.1 g/cm$^3$, a density per area from 0.01 g/cm$^2$ to 0.21 g/cm$^2$ and a characteristic of semi-transmission for the standing waves. The partition wall has a closed end portion. The closed end portion is formed of at least one of the partition wall and the acoustic isolation walls. The space is a substantially closed space.*

9 Claims, 8 Drawing Sheets

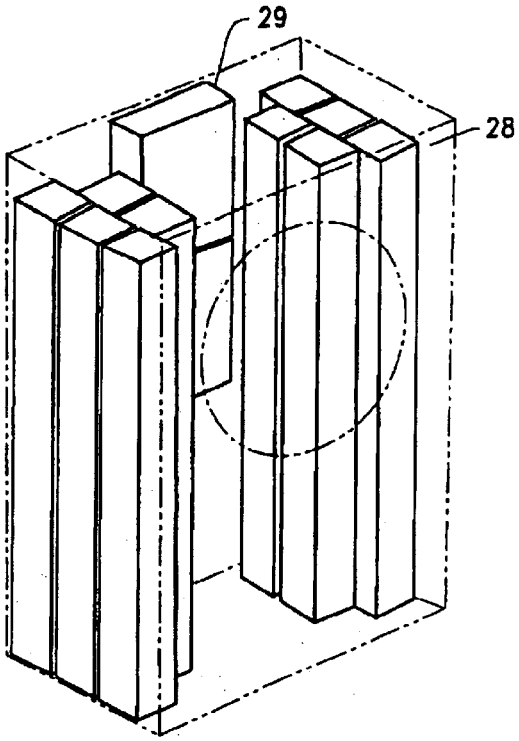
FIG. 8( A )
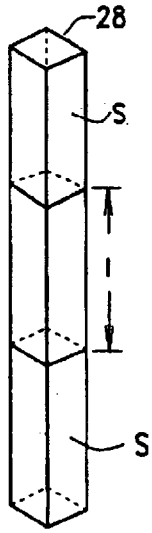
FIG. 8( B )
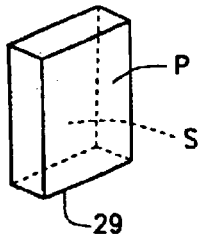
FIG. 8( C )
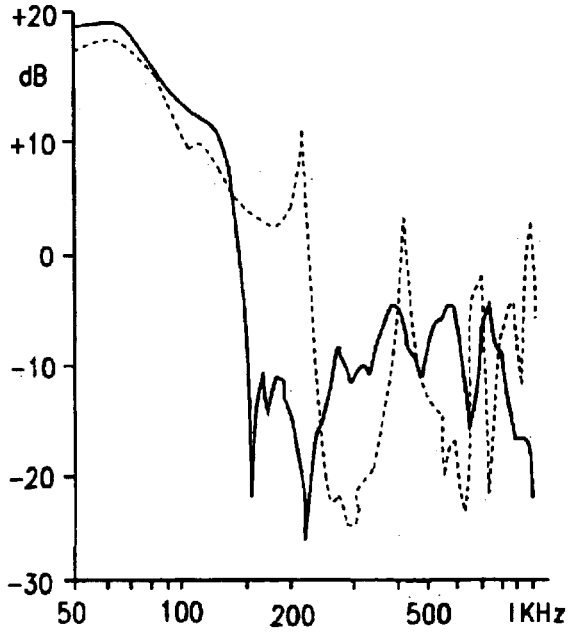
FIG. 8( D )

SPEAKER SYSTEM AND A METHOD FOR IMPROVING SOUND QUALITY THEREOF

Matter enclosed in heavy brackets [ ] appears in the original patent but forms no part of this reissue specification; matter printed in italics indicates the additions made by reissue.

This application is a continuation of application Ser. No. 08/373,250, filed Feb. 7, 1995 now abandoned which is a 371 of PCT/JP92/01721 filed Dec. 28, 1992.

TECHNICAL FIELD

This invention relates to a cabinet where little standing waves are generated particularly to a speaker system comprising a cabinet suitable for reproducing high fidelity sounds, and a method for improving sound quality thereof.

BACKGROUND ART

Hitherto, a closed type cabinet, a bass-reflex type cabinet and a non-back baffle type cabinet have been known as a speaker cabinet. In the conventional cabinets, standing waves are generated by resonance of air inside the cabinet. The standing waves cause various problem as follows:

(1) The standing waves interrupt movement faithful to signals of a diaphragm of a speaker unit. As a result, an output sound frequency characteristic is disturbed and reproduced sound is distorted.

(2) A wall surface of the cabinet resonates with standing waves to produce sounds of the cabinet. A reproduced sound accompanied by the sounds of cabinet is different from an original sound. Also, the reproduced sound sounds as if it winds round the cabinet and has little exposition.

(3) A resonant sound of the standing waves leaks through the diaphragm of the speaker unit or a wall of the cabinet. Consequently, a specific sound of the reproduced sound has reverberation and is not clear. For solving these problems, various proposals have been made.

For example, in regard to the above problem (1), there have been proposed a method for filling up the cabinet with a sound absorbing material; a method for using a perforated sound absorbing board (Japanese [U.M.] *Examined Utility Model Application* Publication [JITSUKOSHO] No. 49-27241); a method for using a perforated sound absorbing board together with a sound absorbing material (Japanese [U. M.] *Unexamined Utility Model Application* Publication [JITSUKAISHO] No. 54-3930); a method for setting a sound reflecting board (Japanese [U. M.] *Examined Utility Model Application* Publication [JTTSUKOSHO] No. 57-49492); a method for using a honeycomb core together with a sound absorbing material (Japanese *Examined* Patent *Application* Publication [TOKUKOSHO] No. 58-45236); and a method for providing a sound absorbing cabinet inside the cabinet (Japanese *Examined* Patent *Application* Publication [TOKUKOSHO] No. 61-61597). For the problem (2), it has been proposed that walls of a cabinet are thickened. For the problem (3), a method for covering an opening of a frame of a speaker unit with a sound absorbing material has been known.

However, these proposals have the following disadvantages.

(1) In case the cabinet is filled with the sound absorbing material, a lively, dynamic sound can not be reproduced. With the perforated board, only a special standing wave having a wave length corresponding to a size of the perforation can be absorbed to thereby have little absorbing effect.

Thus, a plurality of standing waves is generated in the cabinet, which results in no practical use. In case the performed board is used together with the sound absorbing material, various problem accompanied by mal-effects of the sound absorbing material arise. In case the sound reflecting board is used to scatter a sound it is necessary to select a material, size, shape and setting direction of the sound reflecting based according to a direction and a wave length of the Standing wave. Thus, it is difficult to cope with many standing waves. Further, in case an uneven diffusion reflecting structure comprising the sound reflecting board is formed on an inner surface of the cabinet, an effective volume of the cabinet decreases. The honeycomb type core has a large total opening area so that it has an effect only for a specific sound. When the honeycomb core is used together with a sound absorbing material, a reproduced sound is accompanied by a mal-effect of the sound absorbing material. It has been proposed that a sound absorbing cabinet is provided in tie cabinet. However, the purpose is to raise a reproduced sound pressure level by resonating with a sound of specific frequency. The sound absorbing cabinet having small internal loss makes a reproduced sound an unnatural sound accompanied by a reverberation, in resonance with a sound having a specific frequency, if used in a wide range sound reproducing speaks system.

(2) In case the wall of the speaker cabinet is *thickened,* since the standing waves [is] *are* not suppressed the problem of the diaphragm of the speaker unit an not be solved.

(3) In case the opening of the frame of the speaker unit is covered with the sound absorbing material, a large quantity of the sound absorbing material causes a mal-effect to a tone quality. Also, it is difficult to eliminate mal-effects of the standing waves having frequencies less than 300 Hz with only the sound absorbing material.

Accordingly, the present invention is to provide a speaker system which can reproduce a clear bass, sound and a stereophonic sound having an expanded sound field and a method for improving sound quality thereof.

DISCLOSURE OF THE INVENTION

An object of the present invention is accomplished by a speaker system wherein a cabinet has a space enclosed by partition walls therein, the partition walls are formed of a material having high internal loss and semi-transmission for a plurality of standing waves, a total capacity of the space is more then one tenth of a capacity of the cabinet, and a closed end of the space is positioned between one-half and four-fifths of a distance from a longitudinal end of the cabinet to the outer. Also, a ratio of cross-sections of the space and the cabinet is preferably larger than one to five in the cross-section crossing the longitudinal direction of the cabinet. The space may be replaced by a plurality of spaces of different dimensions. Also, a total area of opening areas of the space surrounded by the partition walls is preferably less than am tenth of a tow surface area of the partition walls. Further, the partition walls may have a density per area of more then 0.01 g/cm$^2$ to less than 1.0 g/cm$^2$ and have a density per volume of more than 0.1 g/cm$^3$. The partition walls may be made of paper. The space may be enclosed by the partition on walls and the acoustic isolation walls. The space also may be enclosed by the partition walls, the acoustic isolation walls and a reinforcing member for the acoustic isolation walls. The effect of the present invention is also fully exhibited by the speaker system having the space formed of a paper box.

BRIEF DESCRIPTION OF THE DRAWINGS

*The nature, principle, and utility of the invention will become more apparent from the following detailed descrip-*

*tion when read in conjunction with the accompanying drawings in which like parts are designated by identical reference numbers, in which:*

FIG. 8(A) is a perspective view of a seventh embodiment according to the present [invention,] *invention;*

FIG. 8(B) is a perspective view of a square [tube,] *tube;*

FIG. 8(C) is perspective view of a paper [box, and] *box;*

FIG. 8(D) is a graph showing a frequency characteristic of the seventh [embodiment.] *embodiment;*

DETAILED DESCRIPTION OF PREFERRED EMBODIMENTS

Based on embodiments shown in the attached drawings, speaker systems of the present invention are described hereunder. However, the present invention is not limited to the embodiments.

Figure 1:
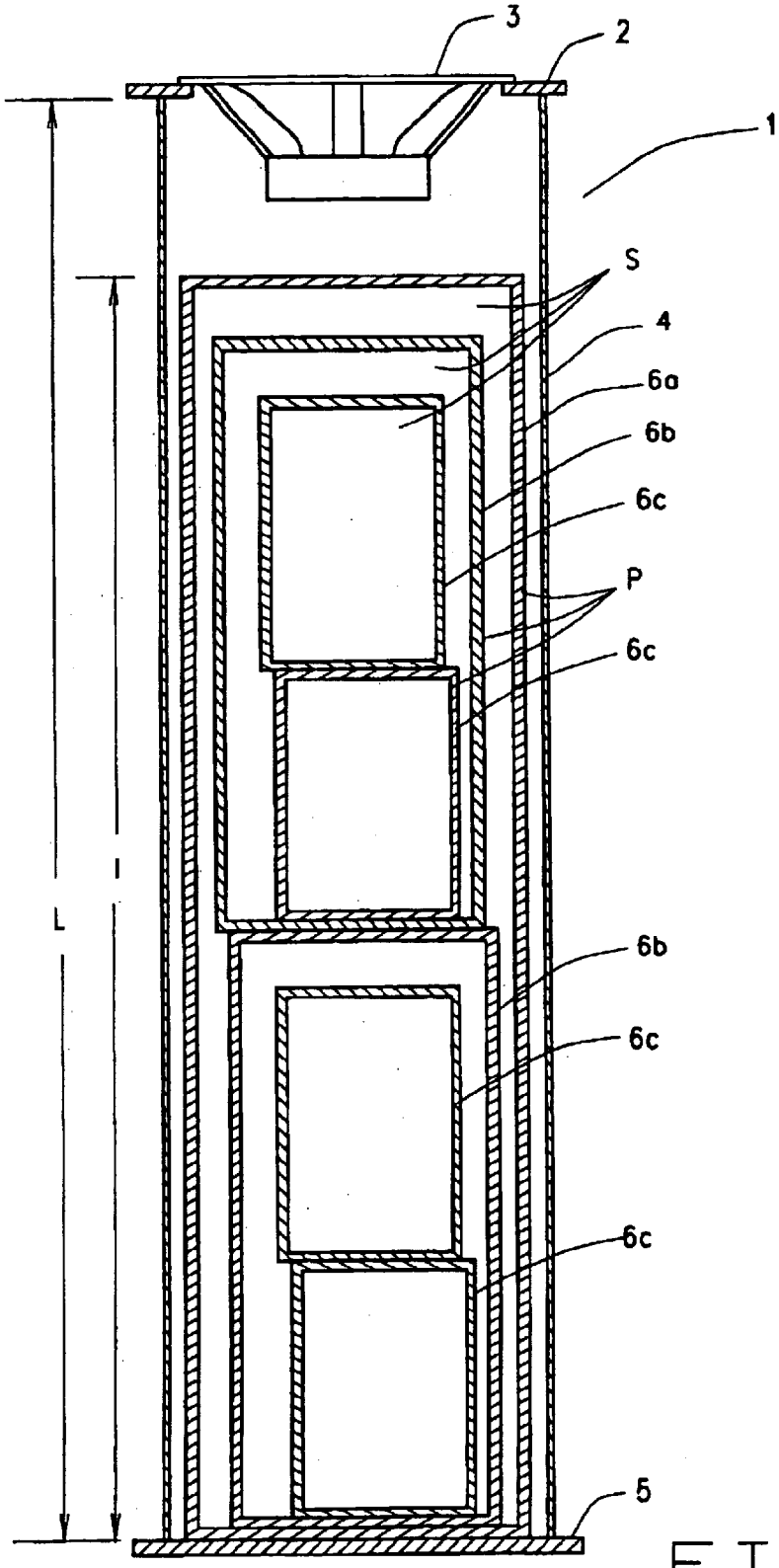
FIG. 1 is a central cross section of a firm embodiment of a cylindrical type speaker system according to the present [invention.] *invention;*

FIG. 1 is a central cross section of the first embodiment of a cylindrical speaker cabinet according to the present invention.

Figure 2:
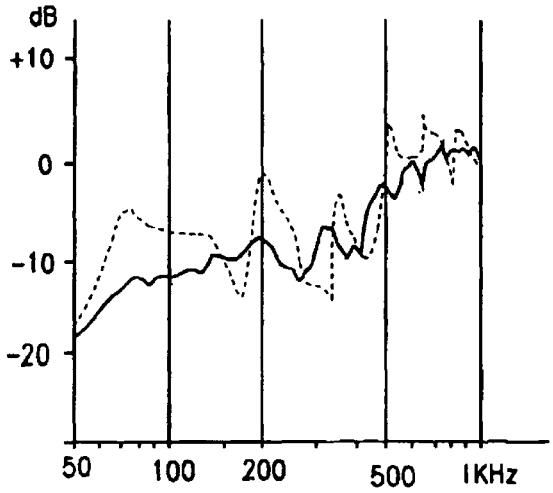
FIG. 2 is a graph illustrating a characteristic of transmission energy to frequency of the first [embodiment.] *embodiment;*

The speaker system of a first embodiment is a tallboy type, non-directional sound radiation speaker system including a speaker cabinet (hereinafter called "cabinet") 1 formed into a longitudinal shape. The cabinet 1 comprises a front baffle 2 and a speaker unit 3 fitted upwardly, at a top of the cabinet. The cabinet 1 comprises side walls 4 formed of a big paper tube of 25 cm in inside diameter, [_ m in length (L) and 5 cm] *1 m in length (L), and 0.5 cm* in thickness, used as a building material. The side walls 4 are mounted on a thick board 5, and the front baffle 2 made of a plywood 1.1 cm in thickness is mounted on the paper tubes. A sound resonance suppressing apparatus type 1 corresponding to the cabinet 1 comprises a plurality of cylindrical tubes 6a, 6b, 6c i.e. partition wall P, to form spaces S therein. The cylindrical tubes are all closed at both ends, and are made of a double wall corrugated cardboard of 0.4 cm in thickness and 0.07 $g/cm^2$ in density per area. The cylindrical tube 6a is 23 cm in outside diameter and 88 cm [in length l] *in length (l)* and has two cylindrical tubes 6b (18 cm in outside diameter, 12 cm in length, respectively), therein. The respective cylindrical tubes 6b have two cylindrical tubes 6c (12 cm in outside diameter, 19 cm in length) therein. Accordingly, four cylindrical tubes 6c are disposed in the cylindrical tube 6a is total. An axis of the big paper tube need not accord with axes of respective cylindrical tubes. A transmission energy frequency characteristic of the speaker system of the first embodiment is shown by a curved line in FIG. 2. A dotted line shows a frequency characteristic of the speaker system formed by eliminating the sound resonance suppressing apparent type 1 from the first embodiment. The frequency characteristics were measured with a microphone disposed at a distance of 10 cm from an edge surface of the speaker unit 3 on the axis, by scanning in sine waves. It is apparent from the graph that a distortion of the frequency response is improved. Clearness of middle and bass sounds is increased, and a sound expansion increases.

Although not shown in the drawings, as a modification of embodiment 1 according to the present invention, two cylindrical tubes 6c located near the speaker unit 3 may be removed. Also, the cylindrical tube 6a may be excluded. Or three cylindrical tubes closed at both ends and having a diameter of 18 cm and a length of 30 cm may be provided instead of the cylindrical tuba 6a, 6b, 6c. Further, the same effect as described above can be obtained by a speaker system comprising nine stacked cylindrical tubes closed at one end and having a diameter of 18 cm and a length of 10 cm. However, with an only cylindrical tube closed at both ends and having a diameter of 18 cm, a length of 83 cm and no partitions therein, a distortion of the frequency response in the vicinity of 180 Hz is not greatly improved. Further in case a plurality of circular boards of double wall corrugated cardboard, having a diameter of 25.2 cm, is fitted in a paper tube of an inside diameter of 25 cm so that the paper tube is divided into plural parts in a longitudinal direction, although listening feeling of sounds it improved, distortion is generated in another region in view of the frequency characteristic.

Incidentally, in case a sheet of kraft pager, Japanese paper, cloth, or resin with a rating elasticity and a large internal loss, which becomes less than 03 mm in thickness when pressed at the time of attaching the speaker unit, is sandwiched between the speaker unit 3 and the front baffle 2, a music, such as jazz including many impact sounds, can be easily heard.

Figure 3A:
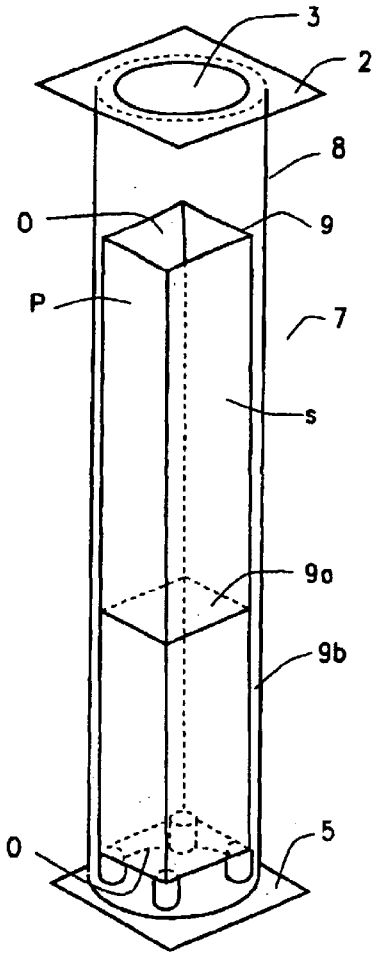
FIG. 3(A) is a perspective view of a second embodiment according to the present [invention and] *invention;*

FIG. 3(A) is a perspective view of a second embodiment of a speaker system according to the present invention.

Figure 3B:
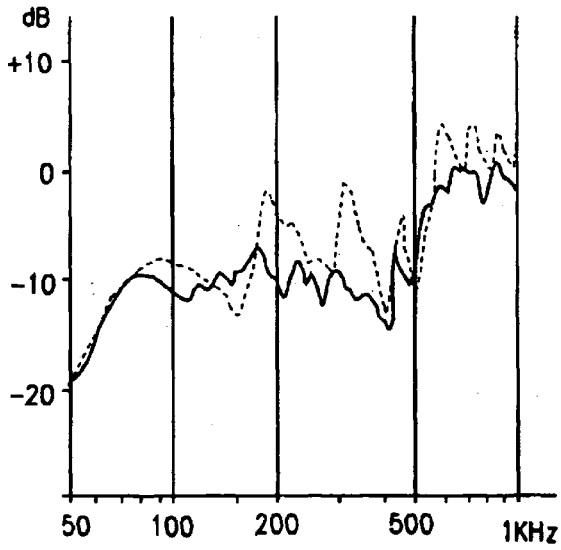
FIG. 3(B) is a graph showing a frequency characteristic of the second [embodiment.] *embodiment;*

Side walls 8 of a cabinet 7 of the second embodiment are formed of paper tubes having an inside diameter of 25 cm. as in the first embodiment, but its height is 117 cm. The sound resonance suppressing apparatus 2 type 9 comprises a square tube i.e. partition wall P made of a double wall corrugated cardboard of 0.4 cm in thickness and paper tube legs having a diameter of 4 cm and a length of 4 cm. Both ends of the square tube are open to form opining areas O. More specifically, a corrugated cardboard square box with a bottom 9a i.e. closed end C having an outside width of 17 cm, a depth of 17 cm and a height of 37 cm is fixed at the bottom, by a adhesive tape, to a corrugated cardboard tube having an outside width of 17 cm, a depth of 17 cm and a heights of 35 cm, and the legs are provided thereunder. Therefore, the bottom 9a functions as a partition wall in a vertical direction. A characteristic of transmission energy to frequency of the second embodiment is shown by a curved line in FIG. 3(B). A dotted line shows a characteristic in case that the sound resonance suppressing apparatus 2 type 9 is removed. It is apparent from the graph that the distortion of the frequency response caused by standing waves is reduced by the sound resonance suppressing apparatus 2 type 9 according to the present invention. Clearness of a bass sound region is improved without reducing dynamic sounds.

Conditions under which the same effect can be obtained by the mode of the present embodiment are described hereinbelow. Effect can be obtained by closing the square tube at one or both ends by a corrugated cardboard or thick board. It is preferable that a cross sectional area of the square tube is about 50±30% of a cross sectional area of the paper tube having a diameter of 25 cm, but in case a total area of cross sectional areas of tube each having a smaller diameter is the same a the above described rate, a plurality of tubes having the smaller diameter may be used.

The partition wall 9a crossing the cabinet in a longitudinal direction is preferably disposed at a position of one-half to four-fifths of a distance from a sound source to an end portion of the cabinet, or at a position of one-half to four-fifths of a distance from one end of the cabinet to the other end.

The partition wall 9a may have a circular shape, a semicircular shape, or a doughnut shape to obtain good effect. The partition wall 9a may be disposed between the partition wall 9b and the side wall 8 in a longitudinal direction. Also, it is preferable that edge portions of the partition wall 9a contact [4(A)] the partition wall 9b in the longitudinal direction.

It is preferable that the partition wall 9b in the longitudinal direction continues from an end of the partition wall 9a to a end of the cabinet. In case the partition wall 9b is semi-transmissive for standing waves in a long wavelength side generated in the cabinet 7, the partition wall 9a may have acoustic isolation.

Figure 4A:
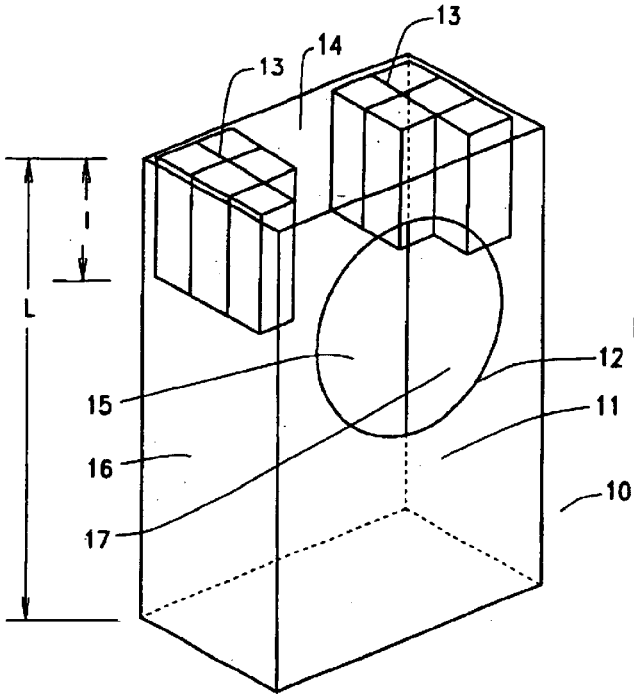
FIG. 4(A) is a perspective view of a third embodiment suitable for a box type speaker system according to the present [invention.] *invention;*

Although not shown in the drawing, as a modified speaker system of the embodiment 2 according, to the present invention, in case a reduced structure having a cross section of about one-half of that of the square tube 9 and a partition wall corresponding to the partition wall 9a provided between one-half to four-fifths of a distance from the from baffle 2 to the partition wall 9a, is additionally mounted inside the square tube 9 of a sound resonance suppressing apparatus 2 type, unevenness of the frequency characteristic is further reduced FIG. 4 is a perspective view of a third embodiment. This embodiment relates to improvement in tone quality by a cabinet in a shape of a rectangular parallelepiped.

A cabinet 10 is a closed-type cabinet made of a plywood or particle board of 2 cm in thickness, and having an inside height of [75 cm] *75 cm,* a width of 50 cm and a depth of 25 cm. A speaker unit (not shown) is a full range speaker having an aperture of 38 cm in diameter and attached to an opening 12 of a front baffle 11.

The same cabinet 10 and the speaker unit a those used in this embodiment are used in embodiments shown in FIGS. 5 through 8.

Figure 4B:
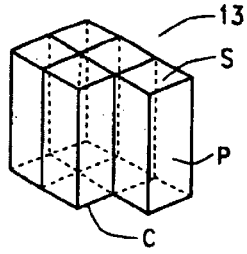
FIG. 4(B) is a perspective view of a paper box [assembly, and] *assembly;*

A sound resonance suppressing apparatus 3 type is formed of paper box assemblies 13. The paper box assembly 13 is formed of a set of five closed boxes integrated by an adhesive tape as shown in FIG. 4(B). Each of the closed boxes is made of a cardboard of 7 cm×7 cm×20 cm and having a thickness of 0.06 cm and a density per area of 0.01 g/cm$^2$. The respective paper box assemblies are brought close to a ceiling 14, back baffle 15 and both sides walls 16, 17 of the cabinet 10, and fixed by a adhesive tape.

Figure 4C:
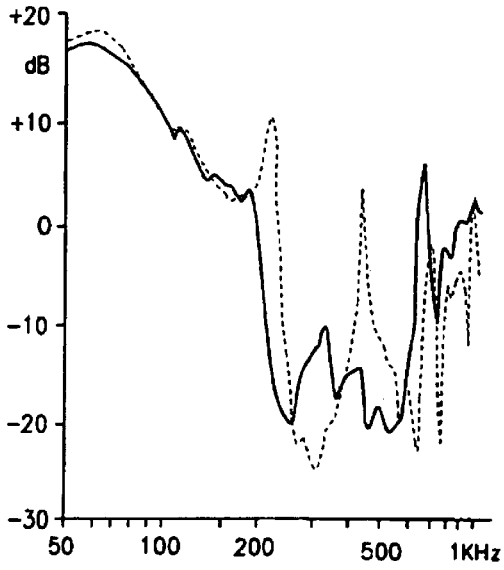
FIG. 4(C) is a graph showing a frequency characteristic of the third [embodiment.] *embodiment;*

FIG. 4(C) shows a frequency characteristic of back sound in the cabinet.

The frequency characteristic was measured by scanning in sine waves with a microphone disposed in the vicinity of an opening of a speaker unit fame. A cord of the microphone was provided through an insertion opening (not shown) provided on the cabinet 10. A curved line shows the frequency response with the sound resonance suppressing apparatus 3 type, and a dotted line shows the frequency response without the sound resonance suppressing apparatus 3 type. It is apparent from the graph that distortion in the frequency characteristic is especially reduced in a region below 500 Hz. Sounds do not lose dynamic sense, and clearness of bass sounds is improved.

In the embodiment, two paper box assemblies were used, but four or six paper box assemblies may be used.

Figure 5A:
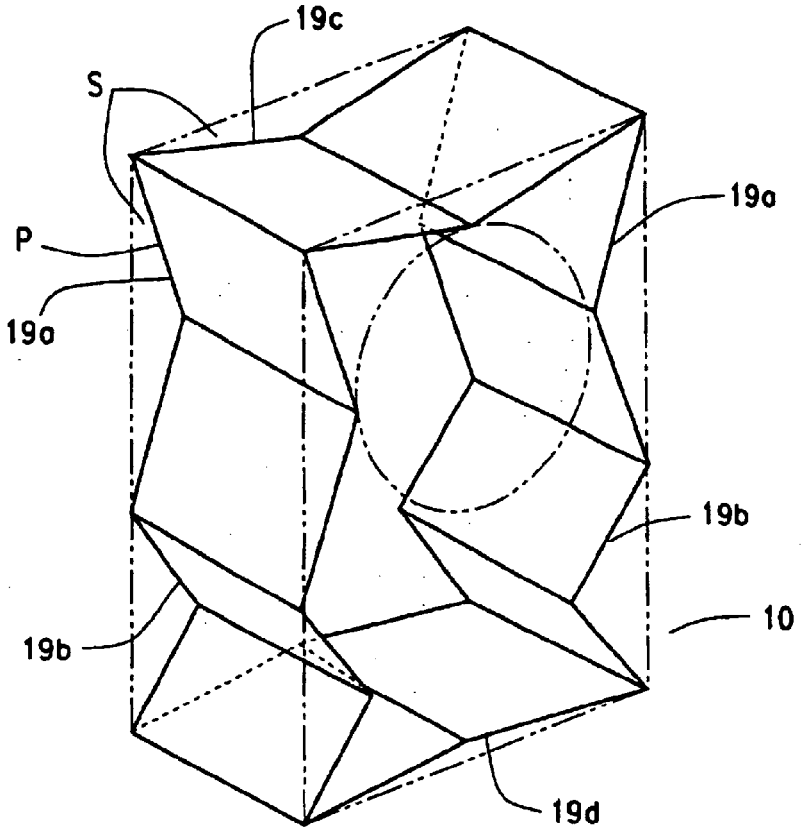
FIG. 5(A) is a perspective view of a fourth embodiment according to the present invention*;*

FIG. 5(A) is a perspective view of a fourth embodiment.

A sound resonance suppressing apparatus 4 type used in the fourth embodiment is formed of angle type corrugated cardboards 19a, 19b, 19c and 19d. The angle type currogated cardboards are formed of a double wall corrugated cardboard of a thickness of 0.4 cm and a width of 25.2 cm so that the tops of the angle portions i.e., height from a bottom portion are 7 cm, 11 cm, 6 cm and [3 cm are the] *3 cm. The* angle cardboard *are* fitted in the peripheral portions of the cabinet between the front baffle 11 and the back baffle 15. For the angle corrugated cardboard 19a, four corrugated cardboards of 25.2 cm×24 cm were used; for the angle corrugated cardboard 19b, four corrugated cardboards of 25.2 cm×18 cm were used; for angle corrugated cardboard 19c, two corrugated cardboards of 25.2 cm×26 cm were used; and for angle corrugated cardboard 19d, two corrugated cardboards of 25.2 cm×25.3 cm were used. In the fourth embodiment, the approximately same effect as that of the third embodiment was obtained.

The effect of the invention is considered to be greater than the diffusion effect of bass sounds, by providing non-parallel surfaces with a double wall corrugated cardboard as a reflecting board.

Figure 5B:
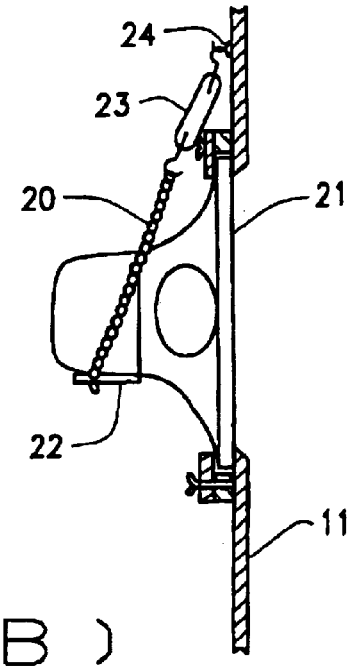
FIG. 5(B) is a section view showing an example of a part of a speaker [unit.] *unit;*

Also, in case a speaker unit having a weight heavier than 1 kg is used in the fourth embodiment, if the speaker unit is suspended by a chain so that a frame abuts against a front baffle, a music, such as jazz, having impact sounds [cane] is [improved.] *improved.* In this case, the frame and the baffle may be fixed together by a bolt to prevent damages caused when the speaker system is moved. Or, the frame may be provided with boards for preventing the speaker unit from being slipped on front, back and side portions of peripheral edge thereof. FIG. 5(B) shows an example of the above structure.

A chain positioning member 22 (iron fitting) is used so that a speaker unit 21 suspended by a stainless steel chain 20 abuts against the front baffle 11. A turnbuckle 23 is used for positioning the speaker unit in a vertical direction. It is better to provide a suspension fitting 24 at a position where the front baffle and the side wall join.

Figure 6A:
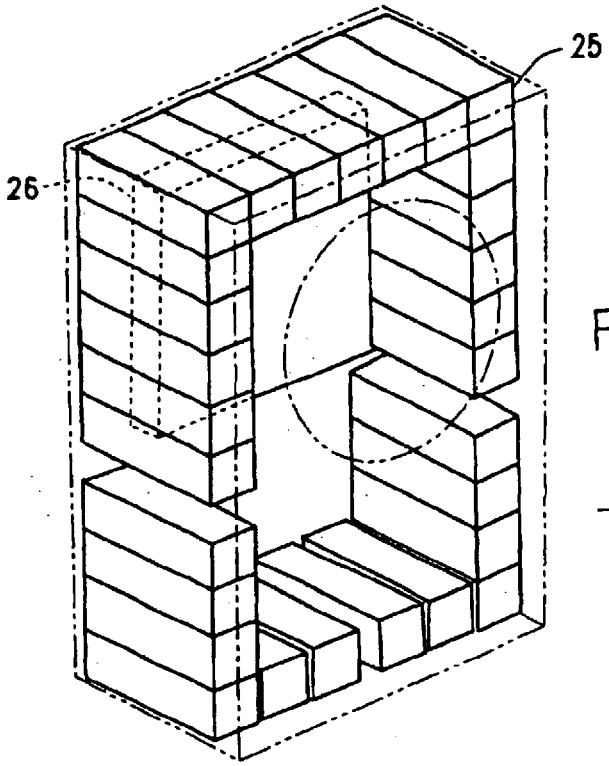
FIG. 6(A) is a perspective view of a fifth embodiment according to the present [invention,] *invention;*
Figure 6B:
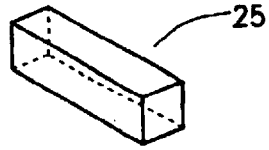
FIGS. 6(B) and 6(C) are perspective views of paper [boxes, and] *boxes;*

FIG. 6(A) is a perspective view of a fifth embodiment.

Figure 6C:
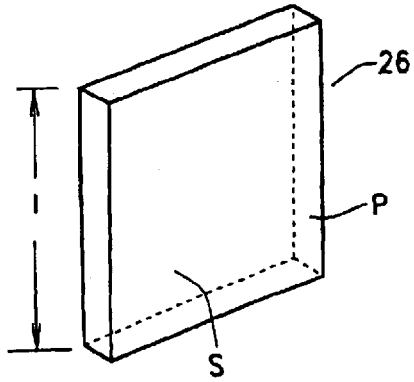

A sound resonance suppressing apparatus 5 type is formed of paper boxes 25 and a paper box 26. The paper box 25 is a closed type box made of a cardboard of 0.06 cm in thickness which is waterproofed on a surface, and has a dimension of 7 cm×7 cm×20 cm, a shown in FIG. 6(B). The twenty-nine paper boxes are disposed along a ceiling board, a bottom board and side walls inside the cabinet, as shown in the drawing, and fixed by an adhesive tape or drawing pins, if necessary. The paper box 26 is a closed box (5 cm×34 cm×36 cm) made of a double wall corrugated cardboard of 0.4 cm is thickness, is shown in FIG. 6(C), and is fixed on the back baffle 15 at a back side of the speaker unit.

Figure 6D:
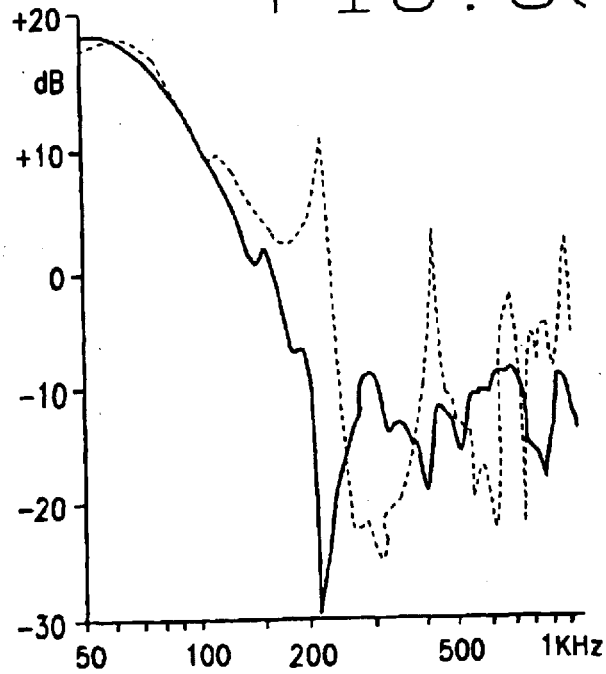
FIG. 6(D) is a graph showing a frequency characteristic of the fifth [embodiment.] *embodiment;*

FIG. 6(D) is a graph showing a frequency characteristic of sounds at the back side. It is apparent from the graph that the standing waves are reduced. Especially, in the fifth embodiment, reduction of the standing waves in the vicinity of 650 Hz is due to the paper box 26 shown in the drawing. Clearness of middle and bass sounds is improved. Clearness of middle and bass sounds is increased. Incidentally, although the twenty-nine paper boxes 25 were used in the embodiment, another fourteen paper boxes may be added to obtain good effect. The additional fourteen paper boxes are stacked on the bottom board so that [forty three] *forty-three* paper boxes in total are used. A bass sound region reproduction limit and reproduction levels in middle and bass sound regions are not greatly changed.

Figure 7A:
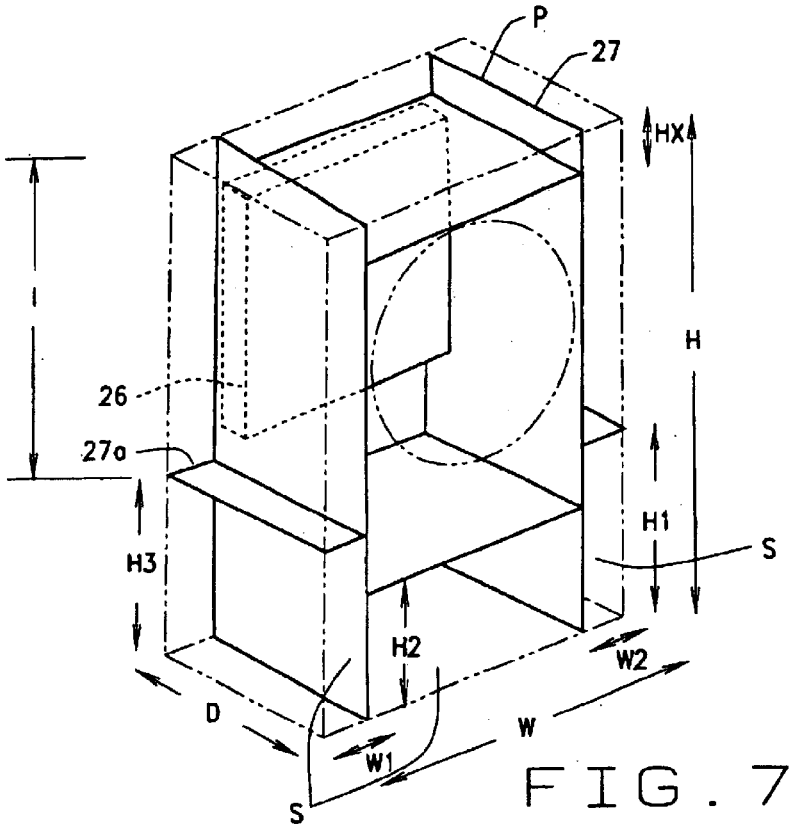
FIG. 7(A) is a perspective view of a sixth embodiment according to the present [invention,] *invention;*

FIG. 7(A) is a perspective view of a sixth embodiment.

A sound resonance suppressing apparatus 6 type of the sixth embodiment is formed of a closed box 26 (5 cm×34 cm×36 cm) made of a double wall corrugated cardboard of 0.4 cm in thickness as used in the sound resonance suppressing apparatus 5 type of the fifth embodiment, and double wall convoluted cardboards 27 having a thickness of 0.4 cm and a width of 25.2 cm. The closed box 26 is fixed to a back baffle as in the apparatus 5 type, and the double wall corrugated cardboard 27 are fitted in parallel to a ceiling board, a bottom board and side boards between front and back baffles so that a plurality of closed spaces are formed therein.

In the sixth embodiment. H=75 cm, H1=H3=28 cm, H2=19 cm, H4=6 cm, W=50 cm, W1=W2=7 cm, and D=25 cm.

Figure 7B:
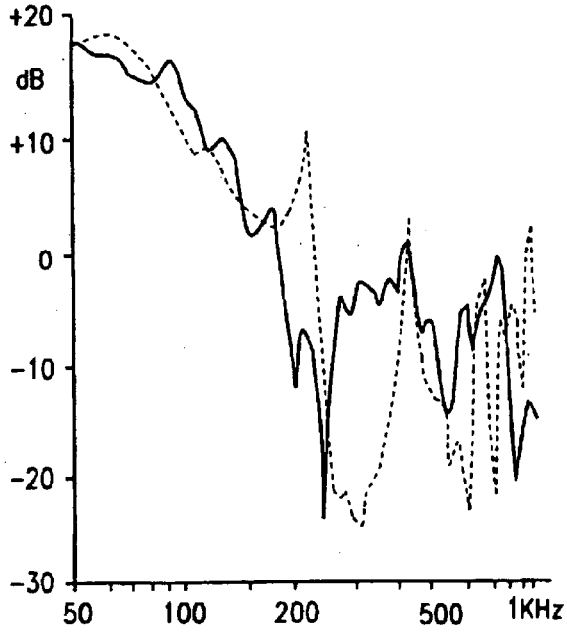
FIG. 7(B) is a graph showing a frequency characteristic of the sixth [embodiment.] *embodiment;*

FIG. 7(B) is a graph showing frequency characteristics of the back side sounds in the sixth embodiment.

It is apparent from the graph that distortion is the frequency characteristic caused by standing waves is reduced. Clearness of middle and bass sounds is improved.

As a modification of the sixth embodiment, a sound resonance suppressing apparatus is considered, wherein a height H1 need not be equal to H3 and the width W1 need not be equal to W2. Further, double wall corrugated cardboards 27a for determining lengths of W1. W2 and contacting both side walls may be replaced with thick boards so that the thick boards can also be used as side wall reinforcing members. In the same way, the double wall corrugated cardboards contacting the front baffle, back baffle, ceiling board and bottom board may be partly replaced by thick boards and also used as reinforcing members therefor.

FIG. 8(A) is a perspective view of a seventh embodiment.

A sound resonance suppressing apparatus 7 type of the seventh embodiment is formed of ten square tubes 28 made of a cardboard and having two inner partitions between closed both ends a shown in FIG. 8(B), and two closed-type corrugated cardboard box 29 a shown is FIG. 8(C). Two sets of the five square tubes 28 are provided uprightly near both tide walls, respectively. The two closed-type corrugated cardboard boxes are fixed side by side to the back baffle at a position opposite to the speaker unit. The square tube 28 is inside of a cardboard of 0.06 cm in thickness, and composed of a closed box of 7 cm×7 cm×[20 cm] *20 cm,* a box of 7 cm×7 cm×24 cm having a open top end which is disposed below the closed box and fixed by an adhesive tape, and another box of 7 cm×7 cm×24 cm having an open top end which is disposed below the box having an open top end and fixed by an adhesive tape to make a square tube of 7 cm×7 cm×68 cm. The two closed corrugated cardboard boxes are made of a double wall corrugated cardboard of 0.4 cm in thickness and have a dimension of 5 cm×15 cm×22 cm.

FIG. 8(D) is a graph showing frequency characteristics of sounds at the back side in the seventh embodiment. A dotted line shows a frequency characteristic when the sound resonance suppressing apparatus is not used, and a curved line shows a frequency characteristic when the sound resonance suppressing apparatus is used. It is apparent from the graph that standing waves are reduced in the embodiment Distortion and reverberation are removed, clearness of middle and bass sounds is increased, and dynamic sounds are reproduced. Ears sense as if sounds come from all the surrounding areas other than the speaker cabinet, and sounds having expansion can be reproduced. Incidentally, in case the cardboard or the corrugated cardboard constituting the sound resonance suppressing apparatus 7 type is crumpled to soften and used, tone quality can be further improved. In the method of the invention, in case the inside partitions of the square tubes are all removed, the effect in the region over 300 Hz is the same as that of the use where the sound resonance suppressing apparatus is used, while distortion in the region of 200 Hz is not greatly reduced.

Figure 9A:
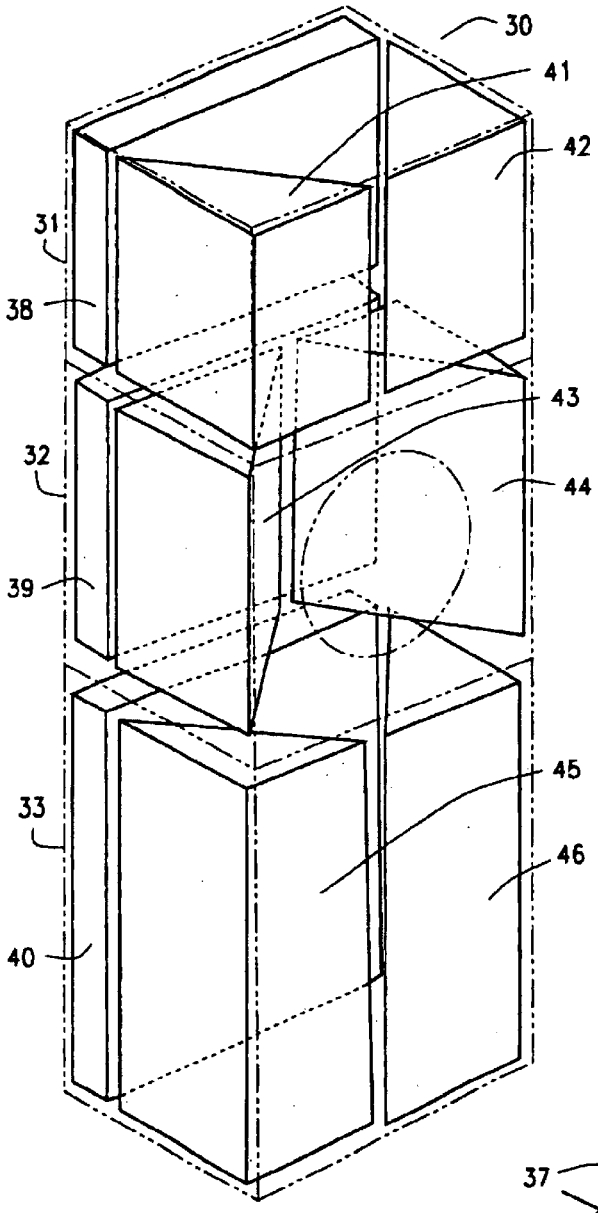
FIG. 9(A) is a perspective view of [a of a] *an* eighth embodiment according to the present [invention,] *invention;*

FIG. 9(A) is a perspective view of an eighth embodiment. The embodiment relates to an improvement of tone quality in a large speaker cabinet.

Figure 9B:
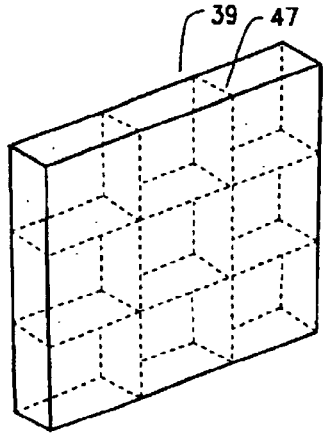
FIGS. 9(B) and 9(C) am perspective views of closed [boxes,] *boxes.
Figure 9C:
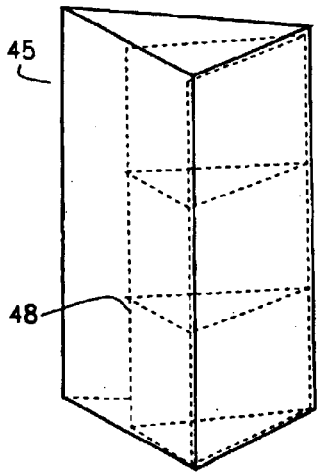
Figure 9D:
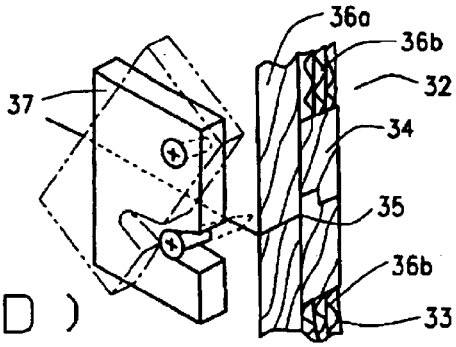
* and FIG. 9(D) is a sectional view for showing an assembly system of a part of cabinets.

A cabinet 30 is a closed-type speaker cabinet having a height of 160 cm, a width of 60 cm and a depth or 40 cm in an outside dimension, wherein those double wall corrugated cardboards 36b of 0.4 cm in thickness are attached to an inside of a plywood 36a of 1.4 cm in thickness, as shown in FIG. 9(D). The cabinet has a structure where three cabinets 31, 32, 33 are stacked so that the cabinet is cut off at heights of 70 cm and 120 cm from a bottom. The stacking portion, as shown in FIG. 9(D), includes a fitting portion 35 for positioning which is reinforced with a thick board 34 and a rotatable fixing member 37 for preventing the cabinets from being fallen down by engaging with the upper and lower cabinet. A speaker unit is a full range speaker having an aperture of 38 cm which is suspended by a chain so that the speaker unit (not shown) abuts against a front baffle of an intermediate cabinet 32.

The sound resonance suppressing apparatus 8 type is formed of closed boxes 38, 39, 46, 41, 42, 43, 44, 45 and 46 made of a double wall corrugated cardboard of 0.4 cm in thickness. The closed boxes 38, 39 and 40 have a depth of 7 cm, and as shown in FIG. 9(B), its representative example has internal partitions 47. The closed boxes 38, 39 and 40 are attached to the back baffles of the respective cabinets 31, 32 and 33, as shown in FIG. 9(A). Closed boxes 41, 42, 43, 44, 45 and 46 respectively have inner boxes 48 inside the outer boxes in a shape of a triangle pole, a shown in FIG. 9(C). The inner box 48 has a cross section of one half of that of the outer box, and is partitioned into three portions therein. The closed boxes 41, 42, 45 and 46 are attached to the front baffles of the respective cabinets 31 and 33. The closed boxes 43 and 44 are attached to the side walls of the cabinet 32.

Even in the large speaker system [of,] *of* this embodiment, reproduced sounds having no distortion, no discomfort, high clearness and improved expansion can be obtained so that TV sounds do not disturb person's ears.

While the representative embodiments of the invention have been explained hereinabove, the present invention is not limited to these embodiments.

As a material for the partition walls to be used in the invention, in addition to a corrugated cardboard and a cardboard, there are mentioned sheet-like materials such as cloth, felt of a high density, resin board, lead sheet, insulation board and thin bond, which have density per area from 0.01 g/cm$^2$ to 1.0 g/cm$^2$ preferably, 0.02 g/cm$^2$ to 0.3 g/cm$^2$; density per volume of higher than 0.1 g/cm$^3$; high internal loss; and low elasticity. The material can be properly selected depending on a wavelength of resonating sound and resulting tone. The sheet-like materials may not be necessarily porous. Also, the partition walls may not necessarily have a known sound absorbing material of volume density of less than 0.05 g/m$^3$, such as glass wool, filled therein.

Assuming that (L) denotes a maximum inner length among the width, depth, and height of the cabinet, the partition wall, as shown by the embodiments in FIGS. 6, 7 and 8, has to be semi-transmissive for at least sounds of wavelengths near the dimension (L) in a longitudinal direction of the cabinet, for example, a wavelength of (L) or a wavelength of twice of (L). That is, the partition wall has so be semi-transmissive for sounds of lower frequencies in the standing waves. It is obvious that a full-transmissive partition wall is not effective. The full-reflective partition wall produces standing waves of different wavelengths in case the partition wall has no diffusion effect, which causes a problem that reduces an effective capacity of the cabinet. Assuming that (l) denotes a maximum dimension among width, depth, and height of the space enclosed by the partition walls, the dimension (l) may be preferably made shorter than (L). A closed end of the space may be preferably formed in between one-half and four-fifths of a distance from one longitudinal end of the cabinet to the other. Also, it is desirable that a ratio of cross-sections of the space and the cabinet is larger than one to five, in the cross-sections crossing the longitudinal direction of the cabinet and located between one-half and four-fifths of the distance from the one end of the longitudinal direction to the other. A total capacity of a space having no sound source of resonant sounds in the above-mentioned space is preferably one-tenth to four-fifths of a capacity of the cabinet. A total area of opening areas of the space surrounded by the partition walls is less than one-tenth of a total surface area of the partition walls. The partition walls forming the space preferably include a partition wall for dividing the longitudinal direction of the cabinet and a partition wall for dividing a crosswise direction of the cabinet.

A simple way is that a tubular space formed of cardboard or corrugated cardboard should be arranged in the cabinet as described below.

First two a three medium closed spaces having a cross-section of one-half to two-thirds of that of the cabinet should be arranged in series from one end to the other in the longitudinal direction of the cabinet The, two or three medium closed spaces arranged in series may be divided into more than two or three sets of slender medium closed spaces. The medium closed spaces may have two or three small closed spaces having a cross-section of one-half of that of the medium closed space arranged therein in series in the longitudinal direction of the cabinet as needed. In case the small closed spaces are arranged outside the medium closed spaces, the cross-sections of the small closed spaces and the medium closed spaces should be one-fourths to one-thirds of that of the cabinet respectively.

Incidentally, the cabinet and spaces may have a little sound absorbing material added therein, as desired.

Further, in the eighth embodiment shown in FIG. 9, the cabinet may have a corrugated cardboard stacked to the inside thereof and may be cut into several cabinets. The separated cabinets may be stacked to form a cabinet. This structure can suppress unnecessary resonance of the cabinet without making the cabinet heavy. Further, the acoustic isolation [wall] *walls* of plywood or the like may have a corrugated cardboard layer therein. This structure can decrease a coefficient of reflection of the sound wave, so that the standing wave can be attenuated faster. Incidentally, the corrugated cardboard layer integrated with the wooden plate forming the cabinet may be replaced by a laminated composite corrugated cardboard layer to be further thickened. Both the wooden plate and the corrugated cardboard layer may be replaced by a similar structure of resin. Also, to make easy replacement of the speaker unit, the speaker unit hung on the middle cabinet 32 by a chain and the front baffle may be constructed so that they can be removed as a unit. Further, the top and the bottom plates of the cabinet my have a box similar to the closed box 38 formed of a double-wall corrugated cardboard adhered to insides thereof.

*The invention is not limited to the above embodiments and various modifications may be made wothout departing from the spirit and scope of the invention. Any improvement may be made in part or all of the components.*

INDUSTRIAL AVAILABILITY

The speaker system and a method for improving tone quality thereof according to the present invention are also available for an air-tight bass-reflex, or back-opening speaker system and a horn speaker system having a speaker cabinet.

What in claimed is:

1. A speaker system for a speaker comprising[,]*;* a cabinet formed of [an] acoustic isolation [wall] *walls*, and having a maximum length L among width, depth and height of an inside of the cabinet[,]*;* a sound source to generate standing waves inside the cabinet[,]*; and* at least one partition wall situated inside the cabinet to form a space by surrounding the space, said partition wall suppressing the standing waves, a least a part of said partition wall being formed of a material which has high internal loss and a density per volume greater than 0.1 g/cm$^3$, and a closed end portion surrounding the space, said closed end portion being formed of at least one of the partition wall and the acoustic isolation [walls,] *walls;* wherein said material has a density per area from 0.01 g/cm$^2$ to 0.21 g/cm$^2$ and a characteristic of semi-transmission for at least two kinds of standing waves of wavelengths of the length L and twice of said length L among the standing waves, said space is a substantially closed space, and a surface of said partition wall directed toward the sound source is substantially flat and [uninterrupt] *uninterrupted* by any protrusion *which reflects said two kinds of standing waves*.

2. A speaker system according to claim 1, wherein said space has a total capacity more than one tenth of a capacity of the cabinet.

3. A speaker system according a claim 1, wherein said partition wall is made of *a* paper box.

4. A method of improving sound quality of a speaker system having a cabinet formed of [an] acoustic isolation [wall] *walls*, said cabinet having a maximum length L among width, depth and height of an inside of the cabinet, comprising forming at least one partition wall to form a space for suppressing standing waves generated inside the cabinet by a sound source and a closed end portion surrounding the space, at least a part of said partition wall being formed of a material which has high internal loss and a density per volume greater than 0.1 g/cm$^3$, and said closed end portion being formed of at least one of the partition wall and the acoustic isolation [wall] *walls* wherein said material has a density per area from 0.01 g/cm$^2$ to 0.21 g/cm$^2$ and a characteristic of semi-transmission for at least two kinds of standing waves of wavelengths of the length L and twice of said length L among the standing waves, said space is a [substatially] *substantially* closed space, and a surface of said partition wall directed toward the sound source is substantially flat and [uninterrupt] *uninterrupted* by any protrusion *which reflects said two kinds of standing waves*.

5. A method [(] of improving sound quality of a speaker system[)] according to claim 4, wherein said partition wall is made of *a* paper box.

6. A speaker system for a speaker comprising[,]*:* a cabinet (7) formed of acoustic isolation walls (2, 8, 5), and having a maximum length L among width, depth and height of an inside of the cabinet (7)[,]*;* and at least one partition wall (9, 9a, 9b) situated inside the cabinet (7) to form a space by surrounding the space, said partition wall (9, 9a, 9b) suppressing standing waves produced inside the cabinet (7) by a sound source [;], said partition wall (9, 9a, 9b) being formed of a material having high internal loss[;], said space having a total capacity more than one tenth of a capacity of the cabinet (7), wherein a closed end (9a) of the space is located between one-half and four-fifths of a distance from one end of the length L to the other end, an opening area (O) of the same space being located at a side opposite to the closed end (9a) in a longitudinal direction of the cabin (7) having the length L[;], said opening area (O) being located between four-fifths and five-fifths of a distance from one end of the length L to the other end[;], the partition wall (9, 9b) in the longitudinal direction continuing from the closed end (9a) to the opening area (O)[;], a cross-sectional dimension of the space being shorter than a depth of the space[;], and a surface of said partition wall directed toward the sound source is substantially flat and [uninterrupt] *uninterrupted* by any protrusion *which reflects said standing waves*.

7. A speaker system according to claim 6, wherein said partition wall is made of *a* paper box.

8. A method of suppressing standing waves generated inside a cabinet by a sound source, said cabinet being formed of [an] acoustic isolation [wall] *walls*, said cabinet comprising forming at least one partition wall to form a space and a closed end portion surrounding the space, at least a part of said partition wall being formed of a material which has high internal loss and a density per volume greater than 0.1 g/cm$^3$, and said closed end portion being formed of at least one of the partition wall and the acoustic isolation [wall] *walls*, wherein said material has a density per area from 0.01 g/cm$^2$ to 0.21 g/cm$^2$ and a characteristic of semi-transmission for *the* standing waves, said space is a closed space, and a surface of said partition wall directed toward the sound source is substantially flat and [uninterrupt] *uninterrupted* by any protrusion *which reflects said standing waves*.

9. A method according to claim 8, wherein said partition wall is made of *a* paper box.

* * * * *

UNITED STATES PATENT AND TRADEMARK OFFICE

CERTIFICATE OF CORRECTION

PATENT NO. : RE 39,330 E 
APPLICATION NO. : 10/718508
DATED : October 10, 2006
INVENTOR(S) : Katsutoshi Tozawa It is certified that error appears in the above-identified patent and that said Letters Patent is hereby corrected as shown below:

On Title Page
Item (57) Abstract, line 3 delete “insulation” and replace with -- isolation --
Col. 1, line 24, delete “problem” and replace with -- problems --
Col. 1, line 34, delete “exposition” and replace with -- expansion --
Col. 2, line 3, delete “performed” and replace with -- perforated --
Col. 2, line 4, delete “problem” and replace with -- problems --
Col. 2, line 8, delete “based” and replace with -- board --
Col. 2, line 9, delete “Standing” and replace with -- standing --
Col. 2, line 18, delete “tie” and replace with -- the --
Col. 2, line 24, delete “speaks” and replace with -- speaker --
Col. 2, line 27, delete “an” and replace with -- can --
Col. 2, line 44, delete “then” and replace with -- than --
Col. 2, line 47, delete “outer” and replace with -- other --
Col. 2, line 53, delete “am” and replace with -- one --
Col. 2, line 53, delete “tow” and replace with -- total --
Col. 2, line 55, delete “then” and replace with -- than --
Col. 2, line 58, delete “on”
Col. 3, line 4, delete “firm” and replace with -- first --
Col. 3, line 47, delete “am” and replace with -- are --
Col. 4, line 17, delete “6a is” and replace with -- 6a in --
Col. 4, line 37, delete “tuba” and replace with -- tubes --
Col. 4, line 42, delete “83 cm” and replace with -- 85 cm --
Col. 4, line 49, delete “it improved” and replace with -- is improved --
Col. 4, line 52, delete “pager” and replace with -- paper --
Col. 4, line 53, delete “rating” and replace with -- small --
Col. 4, line 54, delete “03 mm” and replace with -- 0.3 mm --
Col. 5, line 4, delete “37 cm” and replace with -- 57 cm --
Col. 5, line 7, delete “heights” and replace with -- height --
Col. 5, line 25, delete “same a” and replace with -- same as --
Col. 5, line 41, delete “to a” and replace with -- to an --
Col. 5, line 51, delete “from” and replace with -- front --
Col. 5, line 65, delete “unit a” and replace with -- unit as --
Col. 6, line 6, delete “0.01” and replace with -- 0.04 --
Col. 6, line 9, delete “a adhesive” and replace with -- an adhesive --
Col. 6, line 14, delete “fame” and replace with -- frame --
Col. 6, line 29, delete “currogated” and replace with -- corrugated --
Col. 7, line 5, delete “a shown” and replace with -- as shown --
Col. 7, line 11, delete “is thickness, is shown” and replace with -- in thickness, as shown --
Col. 7, line 34, delete “convoluted” and replace with -- corrugated --
Col. 7, line 47, delete “distortion is” and replace with -- distortion in --

UNITED STATES PATENT AND TRADEMARK OFFICE

CERTIFICATE OF CORRECTION

PATENT NO. : RE 39,330 E
APPLICATION NO. : 10/718508
DATED : October 10, 2006
INVENTOR(S) : Katsutoshi Tozawa It is certified that error appears in the above-identified patent and that said Letters Patent is hereby corrected as shown below:

Col. 7, line 65, delete “a shown” and replace with -- as shown --
Col. 7, line 66, delete “a shown” and replace with -- as shown --
Col. 8, line 1, delete “tide” and replace with -- side --
Col. 8, line 4, delete “inside” and replace with -- made --
Col. 8, line 24, delete “other” and replace with -- rather --
Col. 8, line 31, delete “use” and replace with -- case --
Col. 8, line 38, delete “or 40” and replace with -- of 40 --
Col. 8, line 39, delete “those” and replace with -- three --
Col. 8, line 48, delete “cabinet” and replace with -- cabinets --
Col. 8, line 53, delete first occurrence of “46” and replace with -- 40 --
Col. 8, line 61, delete “a shown” and replace with -- as shown --
Col. 9, line 12, delete “bond” and replace with -- board --
Col. 9, line 13, delete “0.3 $g/cm^2$” and replace with -- 0.5 $g/cm^2$ --
Col. 9, line 28, delete “has so” and replace with -- has to --
Col. 9, line 58, delete “two a” and replace with -- two or --
Col. 10, line 25, delete “my” and replace with -- may --
Col. 10, line 29, delete “wothout” and replace with -- without --
Claim 1, Col. 10, line 49, delete “a least” and replace with -- at least --
Claim 3, Col. 11, line 1, delete “a claim” and replace with -- to claim --
Claim 6, Col. 12, line 5, delete “cabin” and replace with -- cabinet --

Signed and Sealed this

Sixth Day of February, 2007

JON W. DUDAS
*Director of the United States Patent and Trademark Office*